Patented Apr. 11, 1950

2,503,285

UNITED STATES PATENT OFFICE 2,503,285

BETA-SUBSTITUTED ALPHA,BETA-DI-PHENYLETHYLAMINES AND THE PREPARATION THEREOF

Warren D. McPhee, Castleton-on-Hudson, N. Y., assignor, by mesne assignments, to Winthrop-Stearns Inc., New York, N. Y., a corporation of Delaware No Drawing. Application October 18, 1945, Serial No. 623,174

9 Claims. (Cl. 260—570.5)

This invention relates to $\alpha,\beta$-diphenylethylamines and salts thereof, wherein the $\beta$-phenyl nucleus is substituted with hydroxyl and alkoxyl radicals, and to methods of preparing the same. In particular it relates to $\alpha$-phenyl-$\beta$ - (3-alkoxy-4-hydroxyphenyl) ethylamines and salts thereof, and to processes of preparing the same.

The object of this invention is to provide new compositions of matter which are useful for therapeutic purposes, due to their valuable analgesic and other therapeutic properties. A further object of this invention is to provide new medicinal preparations having analgesic action which are suited for treatment of humans and animals.

In general the new compositions which are the basis of this invention are $\alpha$-phenyl-$\beta$-(alkoxyhydroxyphenyl) ethylamines, having the following formula:

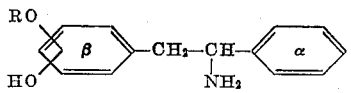

and water-soluble salts thereof, wherein R represents a lower alkyl group. A preferred specific embodiment of the invention comprises $\alpha$-phenyl - $\beta$ - (3-methoxy-4-hydroxyphenyl) ethylamine hydrochloride.

In a preliminary survey, Dodds, Lawson and Williams [Nature, 151, 614 (1943); Proc. Roy. Soc. (London), B, 132, 119 (1944)] reported that certain diphenylethylamines and related compounds relieve pain due to pressure on the nerves of humans with inoperable tumors. In a later note by the same workers [Nature, 154, 514 (1944)] it is stated that the diphenylethylamines and related compounds previously tested clinically are entirely devoid of analgesic activity when tested by the electric shock method on rats. The compounds which had been used clinically have a specific action on nerve pressure pain, but no general analgesic effect. The series of diphenylethylamines tested by the English workers did not, however, include those in which the $\alpha$-phenyl radical is unsubstituted and in which the $\beta$-phenyl radical is substituted with hydroxyl and alkoxyl groups.

I have discovered that $\alpha$-phenyl-$\beta$-(alkoxyhydroxyphenyl) ethylamines and salts thereof produce general analgesic in humans and animals. This discoverey is surprising in light of the disclosure of Dodds, Lawson and Williams [Nature, 154, 514 (1944)] that diphenylethylamines and salts thereof produce no universal analgesic effect.

The amines which are the basis of this invention may be employed either in the form of the free bases or in the form of salts. For parenteral administration it is desirable that the compositions be soluble in water. For this purpose the hydrochlorides of the bases are suitable. Other acids may be used in preparing salts of the amines, among them being sulfuric, citric, lactic and tartaric. The term "salts" is used herein to include any salt of an $\alpha$-$\beta$-diphenylethylamine, wherein the $\beta$-phenyl nucleus is substituted with hydroxyl and alkoxyl radicals, with any acid the anion of which is tolerated in therapeutic dosages.

A possible theoretical explanation of the fact that the $\alpha,\beta$-diphenylethylamines having in the $\beta$-phenyl nucleus hydroxyl and alkoxyl radicals are physiologically active and exert an analgesic effect whereas the $\alpha,\beta$ - diphenylethylamines which are not substituted in such a manner have no analgesic action may be that the former group of compounds resemble morphine more closely than the latter, in that morphine has a 4-hydroxyl group and a 3-ether group in the aromatic ring which corresponds to the $\beta$-phenyl nucleus of the $\alpha,\beta$-diphenylethylamines.

The method used for the preparation of $\alpha$-phenyl-$\beta$-(alkoxyhydroxyphenyl) ethylamines is outlined in the following series of equations and illustrated in the appended examples. It is apparent that any aromatic aldehyde bearing hydroxyl and alkoxyl substituents may be used in preparing the desired $\alpha$-phenyl-$\beta$-(hydroxyalkoxyphenyl) ethylamines and salts thereof without departing from the spirit and scope of my invention. The following examples are merely illustrative and in no way limit my invention.

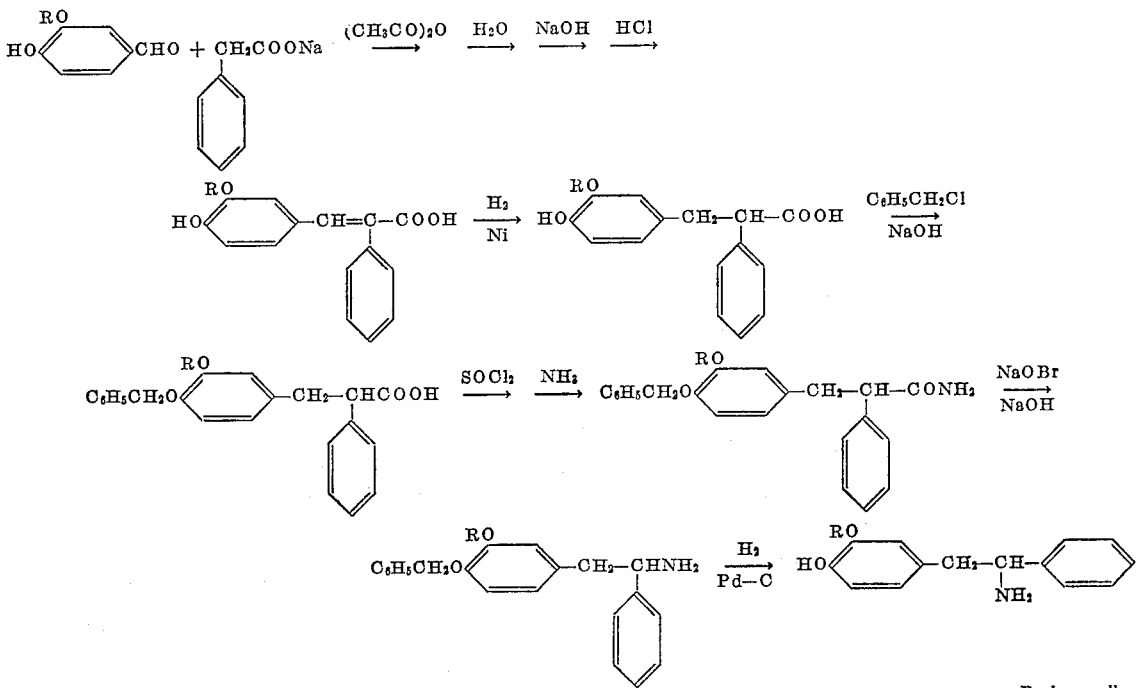

R = lower alkyl

It is further apparent to those skilled in the art that the intermediate α-phenyl-β-(hydroxyalkoxyphenyl) propionic acids can be converted to α - phenyl - β - (hydroxyalkoxyphenyl) ethylamines by other reactions than the Hofmann reaction, which comprises conversion of the acid to the corresponding amide and treatment with hypohalite in alkaline solution. For example, the Curtius reaction or the Lossen reaction can be used. In the former, the acid is converted to the corresponding azide which decomposes into an amine or an amine derivative. In the latter a hydroxamic acid is prepared from the carboxylic acid and it rearranges upon decomposition, forming an amine or derivative thereof.

Example 1

A. *α - Phenyl - 3-methoxy-4-hydroxycinnamic acid.*—A solution of 131 g. (0.86 mole) of vanillin and 150 g. (0.95 mole) of sodium phenylacetate in 600 cc. (6.38 moles) of acetic anhydride is refluxed for five hours. One hundred and fifty cubic centimeters (8.33 moles) of water is added dropwise to the solution at a rate sufficient to maintain the solution at reflux. Upon cooling, a tan solid separates and is washed thoroughly with water. The tan solid is dissolved in 1800 cc. of 6% sodium hydroxide and the solution refluxed for one hour. Acidification of this solution to pH 2 with concentrated hydrochloric acid yields 137 g. (59% yield) of slightly yellow solid, M. P. 186–187° C. [cf. Dey and Row, Quart. J. Indian Chem., Soc., 1, 277 (1925)].

B. *α-Phenyl-β-(3-methoxy-4-hydroxyphenyl) - propionic acid.*—A solution of 175.8 g. (0.65 mole) of α-phenyl-3-methoxy-4-hydroxycinnamic acid in an equivalent amount of 10% sodium carbonate is diluted to 860 cc. with water. The reduction is carried out at 300–450 lbs./sq. in hydrogen pressure and 100° C. with Raney nickel catalyst and requires four hours. After removal of the catalyst, the solution is acidified to pH 2 with 4 N hydrochloric acid. The white precipitate is washed thoroughly with water. One hundred and sixty-six grams (94% yield) of white powder, M. P. 142–143° C. is obtained. Calculated for $C_{16}H_{16}O_4$: C, 70.42; H, 5.92. Found: C, 70.42; H, 5.91.

C. *α - Phenyl - β - (3 - methoxy - 4 - benzyloxyphenyl) propionic acid.*—A mixture of 118 g. (0.434 mole) of α - phenyl - β-(3-methoxy-4-hydroxyphenyl) propionic acid, 195 g. (1.54 moles) (148 cc.) of benzyl chloride, 3.5 g. (0.021 mole) of potassium iodide, 17.4 g. (0.435 mole) of sodium hydroxide in 100 cc. of water, and 500 cc. of 95% ethanol is brought to reflux. Refluxing is continued for three hours, during which time a solution of 86.8 g. (2.17 moles) of sodium hydroxide in 300 cc. of water is added dropwise with stirring. The solution is refluxed an additional hour. It is evaporated to one-half its original volume and 500 cc. of water is added. The aqueous solution is extracted with ether, then acidified to pH 2 with 4 N hydrochloric acid. The solid which precipitates is recrystallized from 50% aqueous methanol; yield, 100 g. (64%); M. P. 114–115° C. Calculated for $C_{23}H_{22}O_4$: C, 76.22; H, 6.12. Found: C, 76.19; H, 6.31.

D. *α - Phenyl - β - (3 - methoxy - 4-benzyloxyphenyl) propionamide.*—A mixture of 87.1 g. (0.24 mole) of α - phenyl-β-(3-methoxy-4-benzyloxyphenyl) propionic acid and 150 cc. (2.25 mole) of thionyl chloride is refluxed for ten minutes. The excess thionyl chloride is removed in vacuo, and the residue is dissolved in 500 cc. of anhydrous dioxane. The dioxane solution is added dropwise with vigorous stirring to 1 liter of concentrated ammonium hydroxide. The white precipitate is washed thoroughly with water and airdried. A yield of 77.6 g. (89%) is obtained; M. P. 140–142° C. Recrystallization from ethyl acetate gives a M. P. of 142–143° C. Calculated for $C_{23}H_{23}O_3N$: N, 3.88. Found: N, 3.93.

E. *α - Phenyl - β - (3 - methoxy - 4-benzyloxyphenyl) ethylamine hydrochloride.*—A mixture of 74.0 g. (0.205 mole) of α-phenyl-β-(3-methoxy-4-benzyloxyphenyl) propionamide, 274 cc. of 40% sodium hydroxide, 42.7 g. (0.267 mole) of bromine and 500 cc. of water is refluxed for two hours. Upon cooling, the alkaline solution is extracted with ether, the extract dried over anhydrous sodium sulfate and the hydrochloride precipitated with ethereal hydrogen chloride. The 61.1 g. of brown-orange solid, M. P. 193–196° C. is triturated with 100 cc. of hot ethyl acetate to yield 51 gm. (67%) of light yellow solid, M. P. 199–200° C. A sample recrystallized from methanol-dioxane melts at 203–204° C. Calculated for $C_{22}H_{24}O_2NCl$: N, 3.97. Found: N, 3.84.

F. *a - Phenyl - β - (3 - methoxy - 4 - hydroxyphenyl)ethylamine hydrochloride.*—Fifty grams (0.135 mole) of α-phenyl-β-(3-methoxy-4-benzyloxyphenyl)ethylamine hydrochloride is dissolved in 400 cc. of hot methanol. The solution is hydrogenated in two portions at 55° and 20–60 lbs./sq. in. hydrogen pressure in the presence of palladium-on-charcoal catalyst. After removal of the catalyst, the solution is evaporated to dryness in vacuo. The residue is washed well with ether, resulting in 37.5 g. (99%) of a slightly tan solid, M. P. 219–220° C. with sintering at 218° C. after recrystallization from 50% methanol-ethyl acetate, the purified product melted at 219–220° C. Calculated for $C_{15}H_{18}O_2NCl$: N, 5.01. Found: N, 5.11.

G. *a - Phenyl - β - (3 - methoxy - 4 - hydroxyphenyl)ethylamine.*—An aqueous solution of α-phenyl-β-(3-methoxy-4-hydroxyphenyl)ethylamine hydrochloride is brought to pH 7 with dilute alkali. The turbid mixture is extracted four times with ether and the ether extracts dried with anhydrous sodium sulfate. Evaporation of the ether leaves a yellow solid. This is triturated with petroleum ether of B. P. 60–90° C.; the resulting product being a light yellow powder. Crystallization of this powder from a mixture of benzene and petroleum ether of B. P. 60–90° C. gives crystals of α-phenyl-β-(3-methoxy-4-hydroxyphenyl)ethylamine having a M. P. of 138–140° C.

*Example 2*

A. *a-Phenyl- 3- ethoxy - 4 - hydroxycinnamic acid.*—This acid is made as shown in Example 1A, using 3 - ethoxy - 4 - hydroxy-benzaldehyde, commonly known as ethyl vanillin. It melts at 186–186.5° C., after recrystallization from methanol. Calculated for $C_{17}H_{16}O_4$: C, 71.81; H, 5.67. Found: C, 71.83; H, 5.38.

B. *a-Phenyl-β-(3-ethoxy - 4 - hydroxyphenyl)propionic acid.*—Catalytic hydrogenation of α-phenyl-3-ethoxy-4-hydroxycinnamic acid in dilute sodium carbonate solution in the presence of Raney nickel, followed by removal of catalyst and acidification, as in Example 1B, results in nearly the theoretrical yield of α-phenyl-β-(3-ethoxy-4-hydroxyphenyl)propionic acid, which melts at 144–146° C. Calculated for $C_{17}H_{18}O_4$: C, 71.31; H, 6.34. Found: C, 71.40; H, 6.06.

C. *a - Phenyl-β-(3-ethoxy-4-benzyloxyphenyl) propionic acid*, is made by benzylating α-phenyl-β-(3 - ethoxy - 4 - hydroxyphenyl)propionic acid with benzyl chloride in alkaline solution, according to the method set forth in Example 1C. It melts at 105–106° C. Calculated for $C_{24}H_{24}O_4$: C, 76.57; H, 6.44. Found: C, 76.58; H, 6.53.

D. *a-Phenyl-β-(3-ethoxy-4 - benzyloxyphenyl) propionamide* is prepared by the method given in Example 1D, using thionyl chloride and aqueous ammonia. It melts at 139–140° C. Calculated for $C_{24}H_{25}O_3N$: N, 3.73. Found: N, 3.67.

E. *a-Phenyl-β-(3-ethoxy-4 - benzyloxyphenyl) ethylamine hydrochloride* is made by the Hofmann reaction according to the general method given in Example 1E. It melts at 207–208° C. Calculated for $C_{23}H_{26}O_2NCl$: N, 3.65. Found: N, 3.62.

F. *a-Phenyl-β-(3-ethoxy - 4 - hydroxyphenyl) ethylamine hydrochloride.*—The product of Example 1E is catalytically debenzylated in methanol in the presence of palladium-on-charcoal catalyst. Removal of the catalyst and evaporation of the solvent leaves yellow crystals. Recrystallization from methanol diluted with ethyl acetate gives colorless crystals of M. P. 217–218° C. Calculated for $C_{16}H_{20}O_2NCl$: N, 4.77. Found: N, 4.82.

In addition to the methods shown in the above equations and examples, α, β-diphenylethylamines having substituents in the β-phenyl nucleus can be made by the catalytic reduction of suitably substituted α′-nitrostilbenes. For example, 3 - methoxy - 4 - hydroxy-α′-nitrostilbene may be reduced in methanol solution in the presence of palladium-on-charcoal catalyst to α-phenyl-β-(3-methoxy - 4 - hydroxyphenyl)ethylamine, as shown in the following equation:

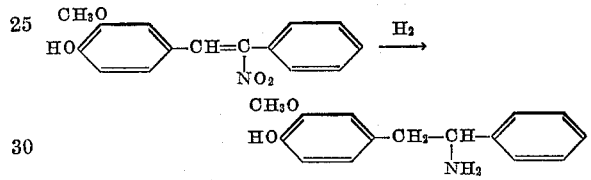

Similarly, 3 - methoxy - 4-benzyloxy-α′-nitrostilbene may be reduced to α-phenyl-β-(3-methoxy-4-hydroxyphenyl)ethylamine. The substituted α′-nitrostilbenes are prepared by condensing substituted benzaldehydes with phenylnitromethane in basic solution.

What I claim is:

1. An α,β-diphenylethylamine containing in the β-phenyl nucleus hydroxyl and lower alkoxyl substituents and salts thereof, said amine and salts thereof having analgesic properties.

2. An α-phenyl-β-(3-alkoxy-4-hydroxyphenyl) ethylamine and salts thereof, said amine and salts thereof having analgesic properties.

3. α-Phenyl-β-(3-methoxy-4 - hydroxyphenyl) ethylamine and salts thereof, said amine and salts thereof having analgesic properties.

4. α-Phenyl-β-(3-methoxy-4 - hydroxyphenyl) ethylamine hydrochloride, having analgesic properties.

5. α-Phenyl-β-(3 - ethoxy - 4 - hydroxyphenyl) ethylamine and salts thereof, said amine and salts thereof having analgesic properties.

6. α-Phenyl-β-(3 - ethoxy - 4 - hydroxyphenyl) ethylamine hydrochloride, having analgesic properties.

7. A process for the preparation of an α-phenyl-β-aryl-ethylamine which comprises reacting an α-phenyl-β-arylpropionamide devoid of aromatic hydroxyl groups with an alkali metal hypohalite in alkaline solution.

8. In a process for the preparation of an α-phenyl - β - (hydroxyalkoxyaryl)ethylamine, the step which comprises converting an α-phenyl-β-(benzyloxyalkoxyaryl)propionamide into an α-phenyl - β - (benzyloxyalkoxyaryl) ethylamine by reaction with sodium hypobromite in the presence of sodium hydroxide.

9. A process for the preparation of an α-phenyl-β-(3-alkoxy - 4 - hydroxyphenyl) ethylamine which comprises reacting an α-phenyl-β-(3 - alkoxy - 4 - benzyloxyphenyl)propionamide with sodium hypobromite in the presence of sodium hydroxide and debenzylating by catalytic hydrogenolysis the resultant α-phenyl-β-(3-alkoxy-4-benzyloxyphenyl)ethylamine.

WARREN D. McPHEE.

REFERENCES CITED

The following references are of record in the file of this patent:

UNITED STATES PATENTS

| Number | Name | Date |
|---|---|---|
| 2,047,144 | Kharasch | July 7, 1936 |

OTHER REFERENCES

Reichert et al., Chem. Absts., vol. 30, columns 5580–5582 (1936).

Chem. Absts., vol. 33, page 8182 (1940).

Ser. No. 419,811, Kulz (A. P. C.), published April 20, 1943.

Dodds et al., "Nature," vol. 151, p. 614 (1943).

Dodds et al., "Nature," vol. 154, p. 514 (1944).

Organic Chemistry, Fieser & Fieser, pp. 232–233 (1944).